United States Patent
Lin et al.

(10) Patent No.: US 10,146,986 B1
(45) Date of Patent: Dec. 4, 2018

(54) CAPACITIVE IMAGE SENSOR AND METHOD FOR OPERATING THE SAME

(71) Applicant: SunASIC Technologies Limited, Wanchai (HK)

(72) Inventors: Chi Chou Lin, New Taipei (TW); Zheng Ping He, Taipei (TW)

(73) Assignee: SUNASIC TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 15/662,388

(22) Filed: Jul. 28, 2017

(51) Int. Cl.
*G06K 9/00* (2006.01)

(52) U.S. Cl.
CPC ......... *G06K 9/0002* (2013.01); *G06K 9/0008* (2013.01)

(58) Field of Classification Search
CPC ............ G06K 9/0002; G06K 9/00087; G06K 9/00053; G06K 9/40; G06K 9/002; G06K 9/008; G06F 3/044; H03K 17/955; H03K 17/9505
See application file for complete search history.

(56) References Cited

U.S. PATENT DOCUMENTS

| | | | | |
|---|---|---|---|---|
| 6,636,053 B1 * | 10/2003 | Gozzini | ................... | G01D 5/24 324/658 |
| 7,541,816 B1 * | 6/2009 | Liao | ........................ | G06F 3/044 324/548 |
| 7,663,380 B2 * | 2/2010 | Chuang | ................ | G06K 9/0002 324/662 |
| 2003/0102874 A1 * | 6/2003 | Lane | ..................... | G06K 9/0002 324/662 |
| 2003/0112021 A1 * | 6/2003 | Palata | ................. | G01R 27/2605 324/658 |
| 2004/0104727 A1 * | 6/2004 | Morimoto | ............ | G01D 5/2417 324/409 |
| 2004/0212599 A1 * | 10/2004 | Cok | ........................ | G06F 3/045 345/173 |
| 2006/0153431 A1 * | 7/2006 | Ando | .................. | G06K 9/00067 382/124 |
| 2009/0135158 A1 * | 5/2009 | Takahashi | ............. | G06F 3/0416 345/174 |
| 2010/0085322 A1 * | 4/2010 | Mamba | .................... | G06F 3/044 345/173 |
| 2013/0106769 A1 * | 5/2013 | Bakken | ................... | G06F 3/044 345/174 |
| 2016/0180619 A1 * | 6/2016 | Riedijk | .............. | G07C 9/00158 324/679 |
| 2016/0275332 A1 * | 9/2016 | Lin | ....................... | G06K 9/0002 |

* cited by examiner

*Primary Examiner* — Samir A Ahmed
(74) *Attorney, Agent, or Firm* — Jackson IPG PLLC; Demian K. Jackson

(57) ABSTRACT

A capacitive image sensor and a method for operating the capacitive image sensor are provided. The capacitive image sensor has an array of capacitive sensing units for transforming a distance between each of the capacitive sensing units and a surface of an adjacent finger into an output electric potential. The capacitive sensing unit comprises: a protective layer; a first sensing plate, formed under the protective layer; a second sensing plate, formed under the first sensing plate; an active semiconductor circuitry, formed under the second sensing plate and connected to the first and second sensing plates; at least one first insulating layer, formed between the first sensing plate and the second sensing plate; and at least one second insulating layer, formed between the second sensing plate and the active semiconductor circuitry.

6 Claims, 7 Drawing Sheets

| STEP | SW1 | SW2 | SW3 | FUNCTION |
|---|---|---|---|---|
| A | Off | On | On | RESET |
| B | Off | Off | Off | ISOLATION |
| C | On | Off | Off | CHARGE |
| D | Off | Off | Off | ISOLATION |
| E | Off | On | Off | HOLD |
| F | Off | On | Off | MEASURE(HOLD) |

CAPACITIVE IMAGE SENSOR AND METHOD FOR OPERATING THE SAME

FIELD OF THE INVENTION

The present invention relates to an image sensor and a method to operate the image sensor. More particularly, the present invention relates to a capacitive image sensor and a method to operate the capacitive image sensor.

BACKGROUND OF THE INVENTION

There are many human physiological characteristics which can be used to provide personnel identification for security purposes, such as fingerprint, retina, iris, DNA, or even facial features. For all the devices that are capable of distinguishing some physiological characteristics of one person from others', a fingerprint reader has the lowest cost and complexity, while the identification results are generally pretty good. In addition, the size of data required to store the minutiae of one fingerprint is small (ranging from 120 bytes to 2K bytes). This makes fingerprint identification devices widely accepted in many applications.

There are also many types of sensing techniques for capturing fingerprints. The popular ones are the optical type and capacitive type. Optical fingerprint sensing modules utilize reflected light intensity from the surface of a finger to tell where the ridges and valleys are on the contact portion of the finger. The advantage of the optical technique is reliability and low cost. However, due to the size of the embedded optical lens, the form factor of an optical fingerprint sensing module cannot be kept small. It is difficult for the optical type sensor to be embedded in portable devices. The capacitive-type fingerprint identification modules, on the other hand, are made out of silicon chips and can be made very compact. In some cases, when a fingerprint image can be fetched by slide scanning, the fingerprint sensor can be even thin and slim, too. The small form factor of capacitive-type fingerprint identification module makes it suitable for portable applications such as access control badges, bank cards, cellular phones, tablet computers, USB dongles, etc.

Capacitive-type fingerprint sensors are based on the principle that the capacitance of two parallel conductive plates is inversely proportional to the distance between them. A capacitive image sensor consists of an array of sensing units. Each sensing unit contains a sensing electrode. By using the sensing electrode as one plate of the two-plated capacitor and a dermal tissue as another plate, ridges and valleys of a fingerprint can be located by measuring the different capacitances. There are many prior arts related to the capacitive-type fingerprint identification module. Most of them have been applied to manufacture fingerprint sensors. However, there are also many problems pending for solutions. One of them is the accuracy of the sensing elements.

Due to the high-density nature, the popular capacitive image sensors are mainly manufactured with semiconductor processes. U.S. Pat. No. 7,864,992 discloses a capacitive fingerprint sensing device in which a driving signal is injected into the finger by feeding a conductive drive structure surrounding the sensor array and measuring the resulting change of the charge carried by the sensing structures in the sensor array. Although the fingerprint sensing system according to U.S. Pat. No. 7,864,992 provides an excellent combination of fingerprint image quality and sensor protection, it would, in some applications be desirable to be able to acquire a high-quality fingerprint image without the use of a separate conductive drive structure. Therefore, an innovative structure of a sensing unit, a capacitive image sensor made by the sensing units and a method for running the sensing unit are desirable.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

A capacitive image sensor is disclosed by the present invention. The capacitive image sensor includes an array of a number of capacitive sensing units for transforming a distance between each of the plurality of capacitive sensing units and a surface of an adjacent finger into an output electric potential, characterized in that each of the plurality of capacitive sensing units comprises: a protective layer; a first sensing plate, formed under the protective layer; a second sensing plate, formed under the first sensing plate; an active semiconductor circuitry, formed under the second sensing plate and connected to the first and second sensing plates, comprising: a first switch, connected between the second sensing plate and a reference voltage source, wherein a reference voltage is provided to the second sensing plate by the reference voltage source while the first switch is turned on; a second switch, connected between the first sensing plate and ground, for discharging the first sensing plate when turned on; a third switch, connected between the second sensing plate and ground, for discharging the second sensing plate when turned on; and a voltage follower, having an output node and an input node which is connected to the second sensing plate; at least one first insulating layer, formed between the first sensing plate and the second sensing plate; and at least one second insulating layer, formed between the second sensing plate and the active semiconductor circuitry. A reference capacitor is formed between the first sensing plate and the second sensing plate.

The capacitive image sensor may further include at least one signal conditioning circuit which comprises: a measurement circuit, connected to the output node of the voltage follower, for measuring an output voltage of the voltage follower; and a signal process circuit, for translating the output voltage measured by the measurement circuit into a predetermined form.

The capacitive image sensor may also further include a control and TO circuit, for controlling the timing sequence and data input/output of the capacitive image sensor.

Preferably, the second sensing plate has a larger area than the first sensing plate.

The present invention also provides a method for operating the capacitive image sensor. The method includes the steps of: a) turning on the second switch and the third switch and turning off the first switch; b) turning off all the switches; c) turning on the first switch; d) turning off all the switches; e) turning on the second switch; f) repeating the step b) to the step e) for a fixed number of cycles; g) measuring an output voltage from the voltage follower; and h) translating the output voltage into a predetermined form.

The present invention also provides another method for operating the capacitive image sensor. The method includes the steps of: a) turning on the second switch and the third switch and turning off the first switch; b) turning off all the switches; c) turning on the first switch; d) turning off all the switches; e) turning on the second switch; f) measuring the output voltage from the voltage follower; g) repeating the step b) to the step f) for a number of cycles until an output voltage from the voltage follower is greater than a reference voltage; and h) translating the output voltage into a predetermined form.

DETAILED DESCRIPTION OF THE PREFERRED EMBODIMENTS

The present invention will now be described more specifically with reference to the following embodiments.

Figure 1:
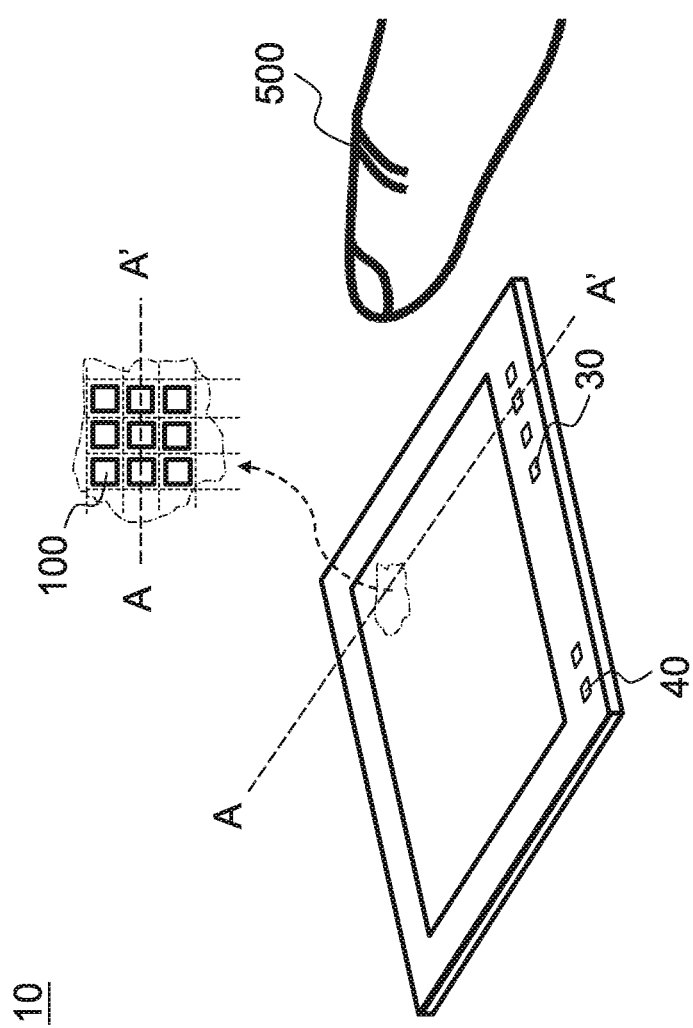
FIG. 1 is a schematic diagram of a capacitive image sensor according to the present invention.

Please see FIG. 1. FIG. 1 shows a schematic diagram of a capacitive image sensor 10 (chip) according to the present invention. The capacitive image sensor 10 is used to depict ridges and valleys of a surface of a finger 500, further converting the results into a noise-reduced image of the fingerprint. The capacitive image sensor 10 includes an array of capacitive sensing units 100, contact pads 40 of a power supply, and contact pads 30 of an input/output (I/O) interface. The output from each capacitive sensing unit 100 represents one corresponding pixel of the fingerprint image.

Figure 2:
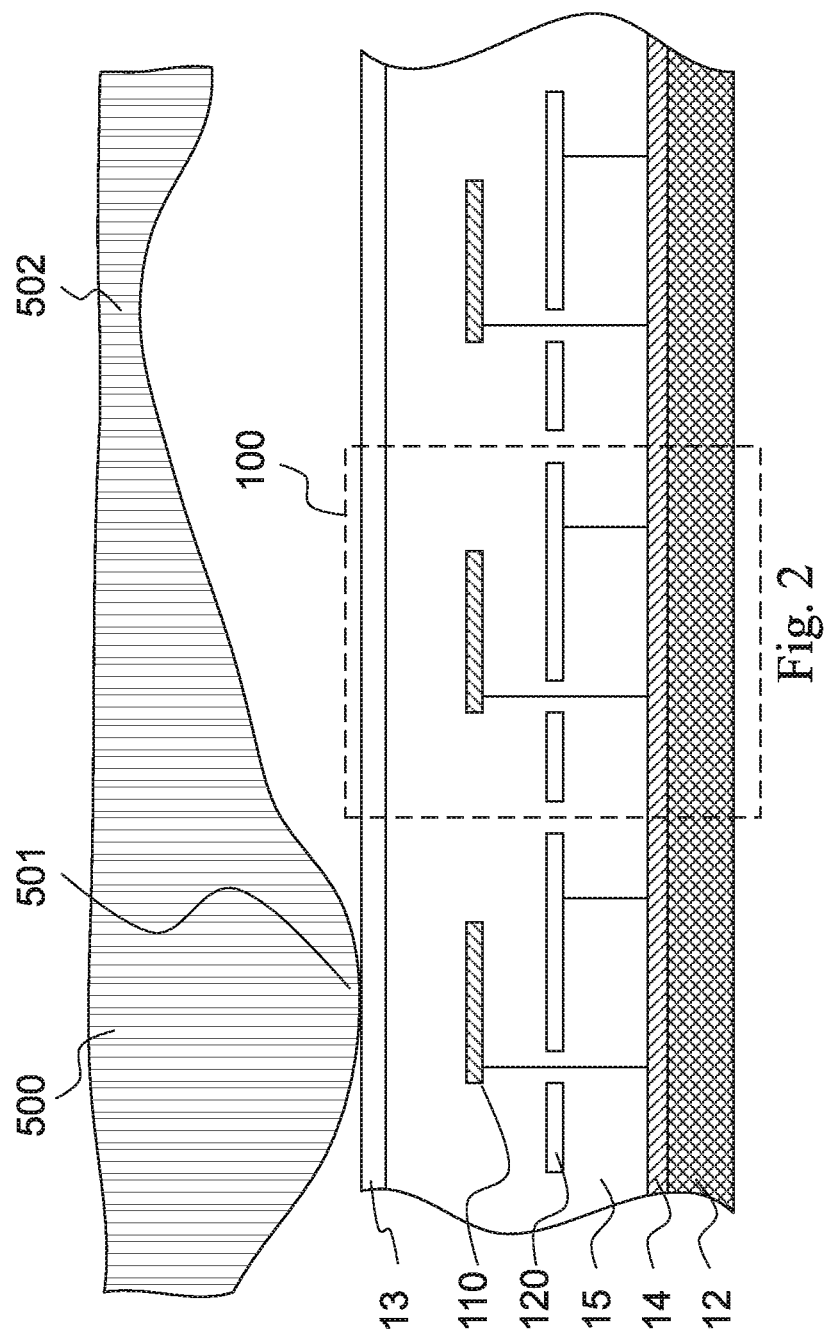
FIG. 2 is a schematic cross-section of a portion of the capacitive image sensor taken along line A-A' in FIG. 1.

FIG. 2 is a schematic cross-section of a portion of the capacitive image sensor 10 taken along line A-A' in FIG. 1, with a protective layer 13 located on top capacitive image sensor 10 and a fingertip 500 placed on the protective layer 13. The protective layer 13 may be made of glass, sapphire, epoxy compound, or coating material. The capacitive image sensor 10 includes a semiconductor substrate 12, having the array of capacitive sensing units 100 formed thereon. The surface of the fingertip 500 includes ridges 501 that are in contact with the protective layer 13 and valleys 502 that are spaced apart from the protective layer 13. Each capacitive sensing unit 100 can be used to transform a distance between a portion of a surface of the approaching finger 500 and a top surface of itself into an output electric potential. Three capacitive sensing units 100 are shown in FIG. 2, and one of the capacitive sensing units 100 is enclosed by a dashed frame. Each capacitive sensing unit 100 includes a first sensing plate 110 and a second sensing plate 120. Below the sensing plates are active semiconductor circuitries 14 schematically shown by a forward-diagonal-lines region in FIG. 2. At least one insulating layer 15 is formed to enclose the sensing plates. In practice, the at least one insulating layer 15 may include multiple dielectric layers formed at different time in the manufacturing process. The at least one insulating layer 15 includes at least a dielectric layer formed between the first sensing plate 110 and the second sensing plate 120, and another dielectric layer formed between the second sensing plate 120 and the active semiconductor circuitries 14. Details of the active semiconductor circuitry 14 will be described in later paragraphs.

Figure 3:
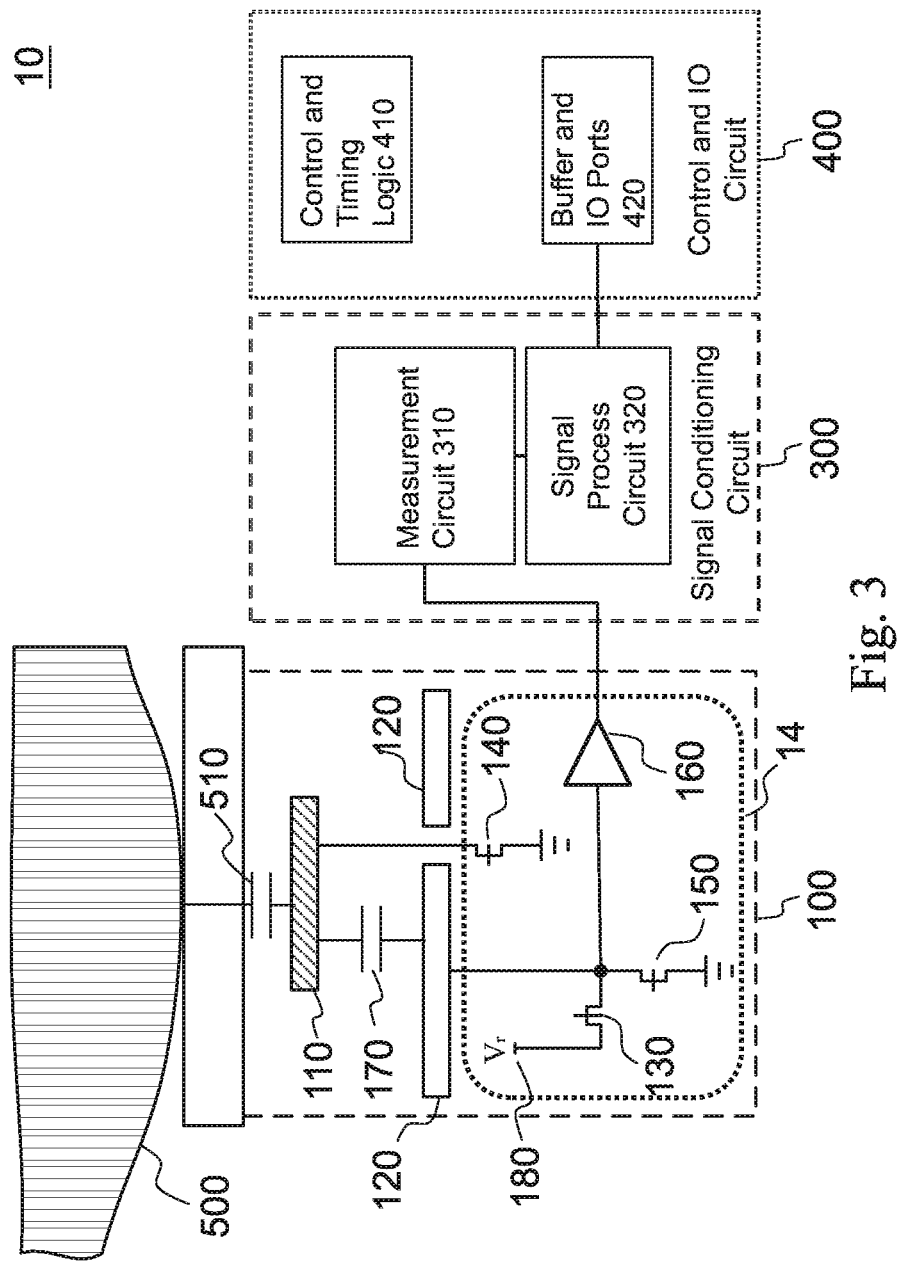
FIG. 3 is an equivalent circuit of the capacitive image sensor (one pixel) of a first embodiment according to the present invention.

Please refer to FIG. 3. FIG. 3 is an equivalent circuit of the capacitive image sensor 10 (one pixel) according to the present invention. The capacitive image sensor 10 includes an array of capacitive sensing units 100 (enclosed by dashed lines), a number of signal conditioning circuit 300 (enclosed by double-dashed lines), and a control and IO circuit 400 (enclosed by double-dotted lines). For illustration purpose, FIG. 3 only shows one capacitive sensing unit 100 and one signal conditioning circuit 300. The signal conditioning circuit 300, the control and IO circuit 400, and a portion of the capacitive sensing unit 100 are formed in the active semiconductor circuitry 14. Each circuit will be described in details below.

The capacitive sensing unit 100 includes a first sensing plate 110, a second sensing plate 120, a first switch 130, a second switch 140, a third switch 150, a voltage follower 160, and a reference voltage source 180. A reference capacitor 170, having a capacitance $C_r$, is formed between the first sensing plate 110 and the second sensing plate 120. The first switch 130 is connected between the second sensing plate 120 and the reference voltage source 180. The second switch 140 is connected between the first sensing plate 110 and ground. The third switch 150 is connected between the second sensing plate 120 and ground. The first switch 130, the second switch 140, the third switch 150, and the voltage follower 160 are formed in the active semiconductor circuitry 14. When a finger 500 approaches the capacitive image sensor 10, a finger capacitance 510, denoted as $C_f$, is formed between the finger 500 and the first sensing plate 110. The first sensing plate 110 is a conductive plate at the top side of the capacitive sensing unit 100, used to form one side of a parallel plate capacitor. Here, the parallel plate capacitor is an equivalent capacitor representing the finger capacitance 510. The other side of the parallel plate capacitor is a portion of the surface of the finger 500, which is part of the human body. The first switch 130 is a MOS device used to control connection between the reference voltage source 180, denoted as $V_r$, to the second sensing plate 120. When the first switch 130 is turned on and the third switch 150 is turned off, the second sensing plate 120 is charged to a reference voltage provided by the reference voltage source 180. The reference voltage source 180 is used to provide a constant reference voltage. The second switch 140 is a MOS device used to control discharging of the first sensing plate 110. When the second switch 140 is turned on, the first sensing plate 110 is discharged to ground potential. The third switch 150 is a MOS device used to control discharging the second sensing plate 120. When the third switch 150 is turned on, the second sensing plate 120 is discharged to ground potential. The voltage follower 160 is a circuit device that has input and output signals. The output signal tracks the input signal. Usually, a voltage follower is implemented as a unity gain amplifier. The input node of the voltage follower 160 is connected to the second sensing plate 120, and the output node is connected to the signal conditioning circuit 300. In addition, the second sensing plate 120 has a larger area than the first sensing plate 110 to block the parasitic capacitance formed between the first sensing plate 110 and the active semiconductor circuitry 14. Because the second sensing plate 120 is formed between the first sensing plate 110 and all other components formed in the active semiconductor circuitry 14, and the second sensing plate 120 is either charged to the predetermined voltages ($V_r$) or discharged to ground during the whole operation, all parasitic capacitances except the parasitic capacitance formed in the second switch 140 are "shielded" by the second sensing plate 120. The signal-to-noise ratio of the sensing element is improved by a combination of the structure and operation described above. Detail of the operation will be described in later paragraphs.

The signal conditioning circuit 300 includes a measurement circuit 310 and a signal process circuit 320. The measurement circuit 310 measures an output voltage of the voltage follower 160 and converts that voltage to another form. The measurement circuit 310 can be an analog-to-digital converter, a simple voltage comparator, an analog buffer, an amplifier chain, etc. All of which are well known in the art. The signal process circuit 320 is used to translate an output of the measurement circuit 320 into a usable form. For example, this may be converting cyclic counts to a binary value, representing signal strength. The signal process circuit 320 may also contain other linear signal processing elements such as filters and/or nonlinear functions such as threshold comparisons as described elsewhere herein, so as to provide an output suitable for an intended application.

The control and IO circuit 400 is a circuit that handles the timing sequence and data input/output of the capacitive image sensor 10. The control and IO circuit 400 includes a control and timing logic 410 and buffer and IO ports 420. The control and timing logic 410 controls all switches in the capacitive image sensor 10, and the operation of the signal conditioning circuit 300. The buffer and IO ports 420 receives the output data from the signal conditioning circuit 300 and store the data in a buffer and then send out the data at a proper time.

Figures 4A, 4B:
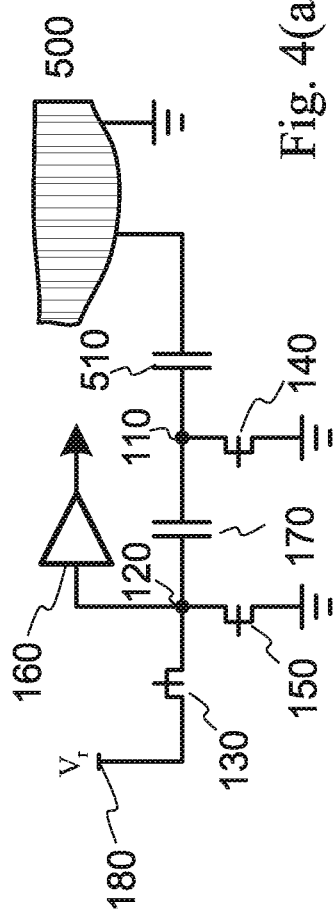
FIG. 4(a) is a simplified equivalent circuit of the capacitive sensing unit in FIG. 3.
FIG. 4(b) is a table of the switching sequence required in the implementation using the circuit of FIG. 4(a).

Please refer to FIG. 4(a) and FIG. 4(b). FIG. 4(a) is a simplified equivalent circuit of the capacitive sensing unit 100 in FIG. 3. The table of FIG. 4(b) shows the switching sequence required in the implementation using the circuit of FIG. 4(a). The first switch 130 (SW1) is used to drive electric charge through both the reference capacitor 170 ($C_r$) and the finger capacitance 510 ($C_f$) to be measured, during Step C in the table of FIG. 4(b). This leaves residual charges on both the reference capacitor 170 ($C_r$) and the finger capacitance 510 ($C_f$) after the first switch 130 (SW1) is turned off in step D in the table of FIG. 4(b). Kirchhoff's circuit laws and the principle of charge conservation indicate that the charges on the reference capacitor 170 ($C_r$) and the finger capacitance 510 ($C_f$) are equal. However, because $C_r \gg C_f$, a greater residual voltage is found on $C_f$. Conversely, a lesser voltage is measured on $C_r$. The arrangement of FIG. 4(a) may be viewed as a capacitive voltage divider in considering the closure of the first switch 130 (SW1) in step C in the table of FIG. 4(b). The second switch 140 is used to clear the charges and set the electric potential of the finger capacitance 510 and as grounding. Meanwhile, the second switch 140 also allows the measurement of $V_{cr}$, a voltage across the reference capacitor 170 ($C_r$). It should be noted that the use of the second switch 140 (SW2) allows the first switch 130 (SW1) to be repeatedly cyclic on and off in order to build up the charges on the reference capacitor 170 ($C_r$). This provides a larger measurable voltage value and greater accuracy, increasing sense gain or sensitivity without the use of active amplifiers. The third switch 150 (SW3) acts as a reset switch and is used to reset the charge on the finger capacitance 510 ($C_f$) prior to beginning a charge transfer cycle.

In step A, the second switch 140 and the third switch 150 are turned on to clear charges on the reference capacitor 170 ($C_r$) and the finger capacitance 510 ($C_f$). After a suitable pause in step A, the first switch 130 is turned on to drive charges through the reference capacitor 170 ($C_r$) and the finger capacitance 510 ($C_f$) (Step C). The resulting first voltage increment across the reference capacitor 170 is defined by the capacitive divider equation:

$$\Delta V_{cr}(1) = \frac{C_f}{C_r + C_f} V_r \qquad \text{Eq. (1)}$$

where $V_r$ is the reference voltage connected to the first switch 130. In Step E, the second switch 140 (SW2) is turned on and other switches are turned off. $\Delta V_{cr}$ appears as a ground-referenced signal on the input node of the voltage follower 160. ISOLATION steps B and D are employed to prevent switch cross-conduction, which would degrade the charge build-up on the reference capacitor 170 ($C_r$). Time for ISOLATION can be quite short, measuring a few nanoseconds, or longer if desired. Steps B through E are a charge transfer cycle, and may be repeated in a looping manner, to accumulate charge on the reference capacitor 170 ($C_r$). On the contrary, the finger capacitance 510 ($C_f$) is continuously discharged in step E, and hence the finger capacitance 510 ($C_f$) cannot build up an increasing amount of charges. The resulting incremental voltage is dependent on the difference between the voltages of $V_r$ and $V_{cr}$ and as follows:

$$\Delta V_{cr}(n) = K(V_r - V_{cr}(n-1)) \qquad \text{Eq. (2)}$$

where n is the number of the charge transfer cycle, and $K = C_f/(C_r + C_f)$.

The voltage across $V_{cr}$ after N charge transfer cycles is:

$$V_{cr}(N) = \Sigma \Delta V_{cr}(n) \qquad \text{Eq. (3)}$$

The result of Equation (3) is a geometric progression and can be re-written as:

$$V_{cr}(N) = V_r[1-(1-K)^N] \qquad \text{Eq. (4)}$$

In Step F, with the second switch 140 (SW2) turned on and all other switches turned off, a measurement of $V_{cr}$ is sent by the voltage follower 160 to the signal conditioning circuit 300.

The charge transfer cycle can be terminated after a fixed or a variable number of cycles. If a fixed number of cycles are applied, the measurement circuit 310 should be capable of converting the output voltage into proper data. For example, the output voltage of each capacitive sensing unit 100 representing the finger capacitance are converted into proper data, i.e. grayscale value, and the converted data are mapped to the corresponding location of each capacitive sensing unit 100 to form a fingerprint image. If a variable charge transfer cycles are applied, a simple comparator with a fixed reference can be employed by the measurement circuit, and the number of the charge transfer cycles required is given when $V_{cr}$ has built up to a level where it equals the comparison voltage. The charge transfer cycles may continue beyond the required number, but the extra charge transfer cycles are redundant. A count of the charge transfer cycles required to achieve the comparison voltage is the output result representing the finger capacitance. The count number then transferred into proper data by the signal conditioning circuit 300. The transferred data may be further mapped to the corresponding location of each capacitive sensing unit 100 to form a fingerprint image. The mapping step may be handled by an external device, such as a MCU, linked to the buffer and IO ports 420 via the input/output (I/O) contact pads 30.

Figures 5A, 5B:
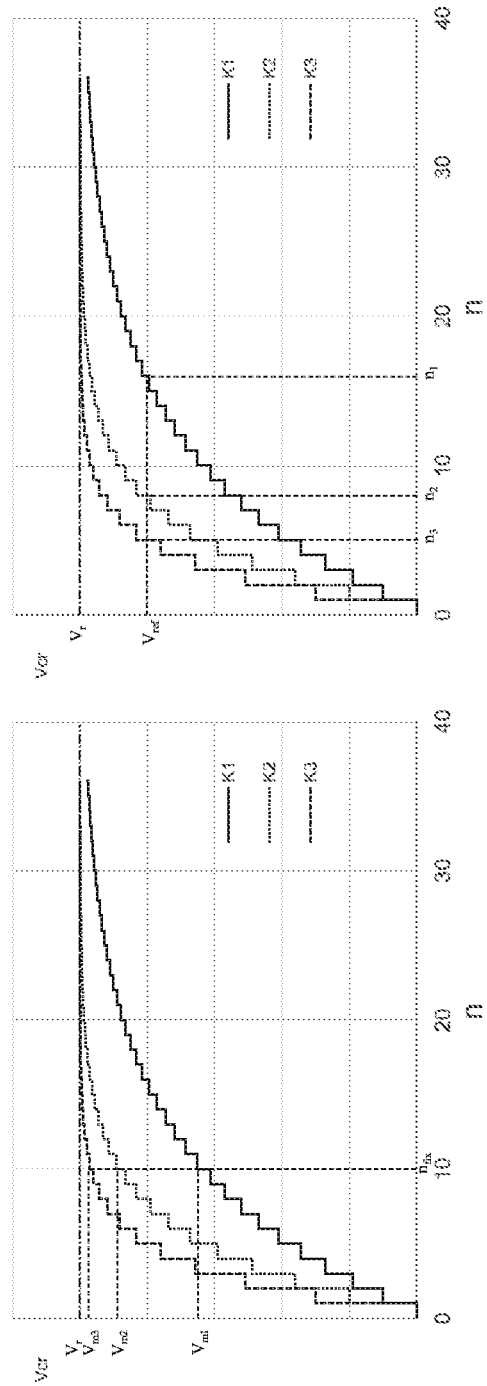
FIG. 5(a) is a plot of a voltage across $C_r$ as a function of cycle number during the operation and the method of a fixed number of cycles is used.
FIG. 5(b) is a plot of a voltage across $C_r$ as a function of cycle number during the operation and the method of a variable number of cycles is used.

Please refer to FIG. 5(a) and FIG. 5(b). FIG. 5(a) and FIG. 5(b) are the plots of a voltage across the reference capacitor 170 as a function of cycle number during the operation. The three sets of data, K1 to K3, represent the relationship between $V_{cr}$ and cycle number at three different value of K. FIG. 5(a) shows the method of a fixed number of cycles ($n_{fix}$=10) is used. The output voltages, $V_{m1}$ to $V_{m3}$, correspond to different $C_f$, and $K=C_f/(C_r+C_f)$. FIG. 5(b) shows the method of a variable number of cycles is used. When the output voltage exceeds the fixed reference voltage ($V_{ref}$), the number of cycles, $n_1$ to $n_3$, will be recorded and then transferred into a proper output data representing $C_f$.

Figure 6:
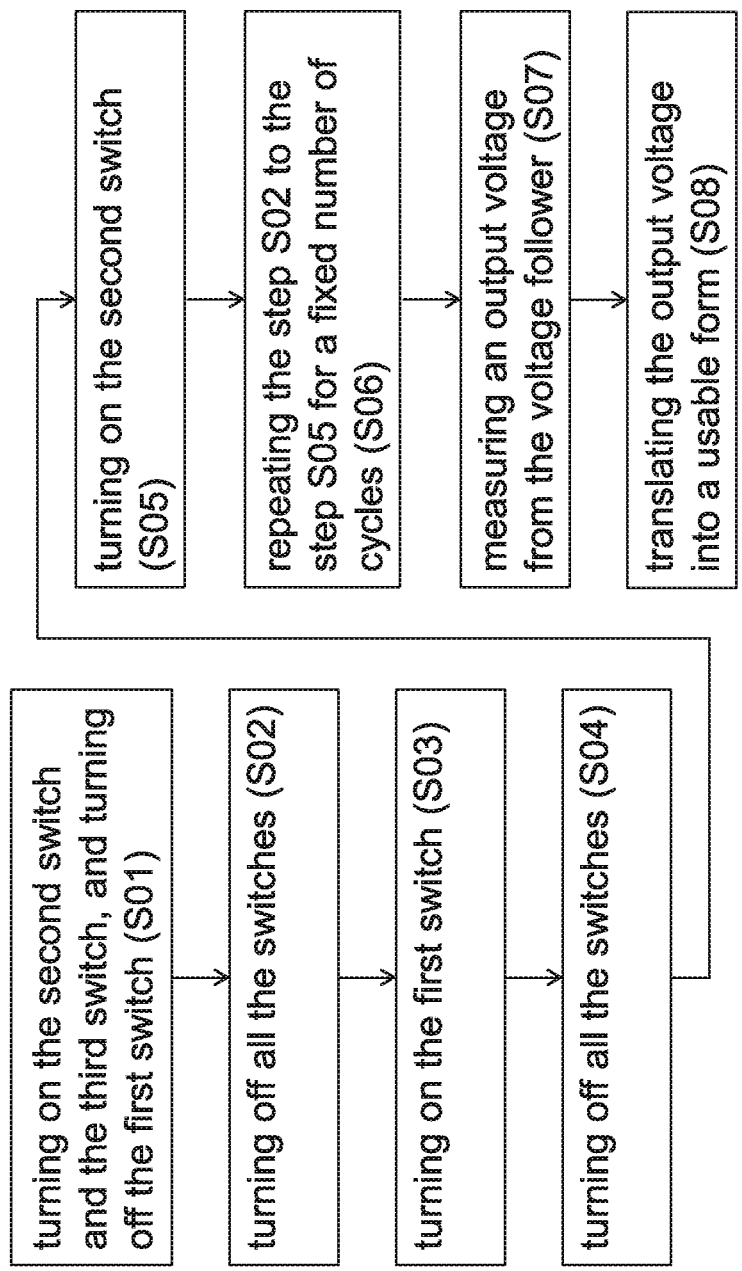
FIG. 6 is a flowchart of a method for operating the capacitive image sensor.
Figure 7:
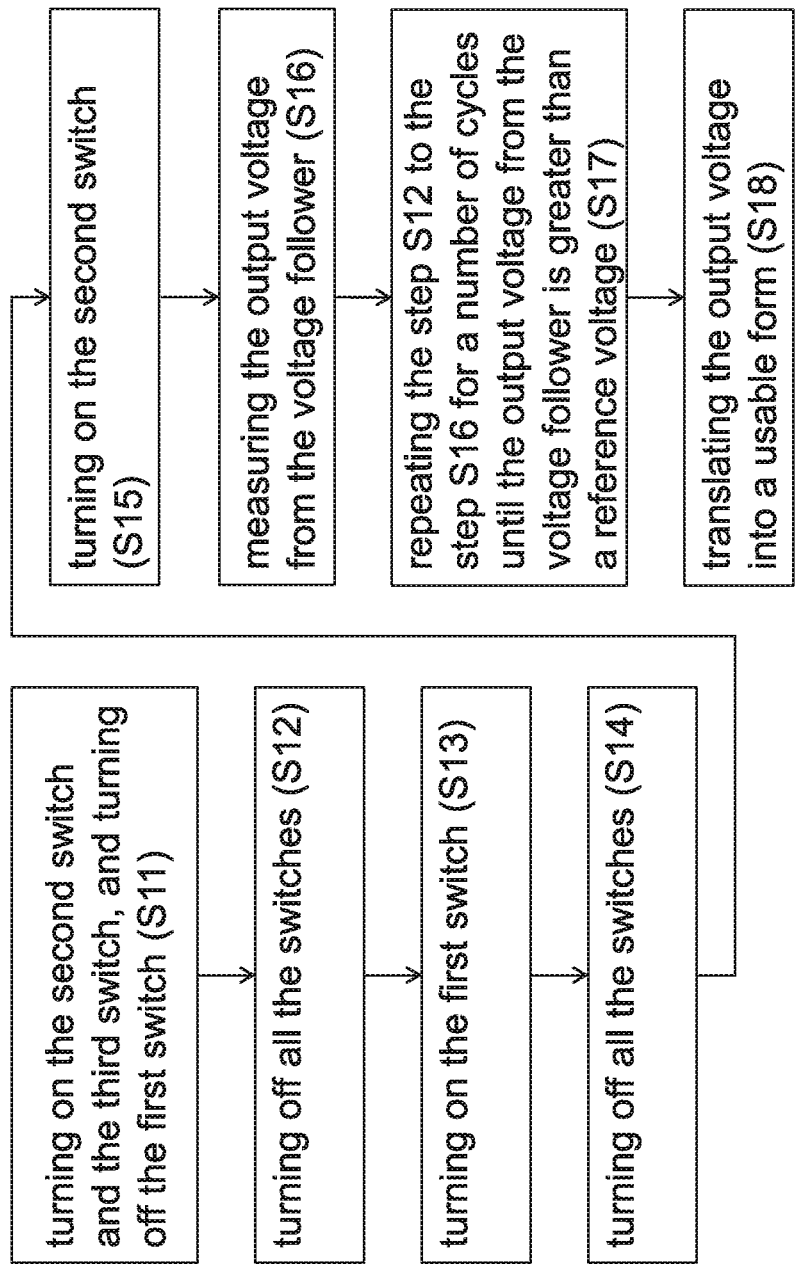
FIG. 7 is a flowchart of another method for operating the capacitive image sensor.

As described above, there are two methods to operate the capacitive image sensor 10. Please see below illustration along with FIG. 6 and FIG. 7. FIG. 6 is a flowchart of a method for operating the capacitive image sensor 10. FIG. 7 is a flowchart of another method for operating the capacitive image sensor 10.

As shown in FIG. 6, the first step of the method is turning on the second switch 140 and the third switch 150, and turning off the first switch 130 to discharge the capacitors to ground voltage (S01). For isolation, turn off all the switches (S02). Then, turn on the first switch 130 to charge the reference capacitor 170 (S03). Again, turn off all the switches for isolation (S04). Then, turn on the second switch 140 to discharge the first sensing plate 110 to ground voltage (S05). This method utilizes a fixed number of cycles to accumulate charges on the reference capacitor 170. Therefore, repeating the step S02 to the step S05 for the fixed number of cycles (S06). Once the step S06 is fulfilled, measure an output voltage from the voltage follower 160 (S07). Finally, translate the output voltage into a predetermined form (S08). Namely, the output voltage is translated into a digitized value as a pixel of a fingerprint image.

As shown in FIG. 7, the first step of the other method is turning on the second switch 140 and the third switch 150, and turning off the first switch 130 to discharge the capacitors to ground voltage (S11). For isolation, turn off all the switches (S12). Then, turn on the first switch 130 to charge the reference capacitor 170 (S13). Again, turn off all the switches for isolation (S14). Then, turn on the second switch 140 to discharge the first sensing plate 110 to ground voltage (S15). Then, measure the output voltage from the voltage follower 160 (S16). This method utilizes a variable number of cycles to terminate charging of the reference capacitor 170. Therefore, repeating the step S12 to the step S16 a number of cycles until an output voltage from the voltage follower 160 is greater than a reference voltage (S17). Finally, translate the output voltage into a predetermined form (S18).

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A capacitive image sensor having an array of a plurality of capacitive sensing units for transforming a distance between each of the plurality of capacitive sensing units and a surface of an adjacent finger into an output electric potential, characterized in that each of the plurality of capacitive sensing units comprises:
   a protective layer;
   a first sensing plate, formed under the protective layer;
   a second sensing plate, formed under the first sensing plate;
   an active semiconductor circuitry, formed under the second sensing plate and connected to the first and second sensing plates, comprising:
      a first switch, connected between the second sensing plate and a reference voltage source, wherein a reference voltage is provided to the second sensing plate by the reference voltage source while the first switch is turned on;
      a second switch, connected between the first sensing plate and ground, for discharging the first sensing plate when turned on;
      a third switch, connected between the second sensing plate and ground, for discharging the second sensing plate when turned on; and
      a voltage follower, having an output node and an input node which is connected to the second sensing plate;
   at least one first insulating layer, formed between the first sensing plate and the second sensing plate; and
   at least one second insulating layer, formed between the second sensing plate and the active semiconductor circuitry,
   wherein a reference capacitor is formed between the first sensing plate and the second sensing plate.

2. The capacitive image sensor according to claim 1, further comprising at least one signal conditioning circuit which comprises:
   a measurement circuit, connected to the output node of the voltage follower, for measuring an output voltage of the voltage follower; and
   a signal process circuit, for translating the output voltage measured by the measurement circuit into a predetermined form.

3. The capacitive image sensor according to claim 1, further comprising a control and TO circuit, for controlling the timing sequence and data input/output of the capacitive image sensor.

4. The capacitive image sensor according to claim 1, wherein the second sensing plate has a larger area than the first sensing plate.

5. A method for operating the capacitive image sensor according to claim 1, comprising the steps of:
   a) turning on the second switch and the third switch and turning off the first switch;
   b) turning off all the switches;
   c) turning on the first switch;
   d) turning off all the switches;
   e) turning on the second switch;
   f) repeating the step b) to the step e) for a fixed number of cycles;
   g) measuring an output voltage from the voltage follower; and
   h) translating the output voltage into a predetermined form.

6. A method for operating the capacitive image sensor according to claim 1, comprising the steps of:
   a) turning on the second switch and the third switch and turning off the first switch;
   b) turning off all the switches;
   c) turning on the first switch;

d) turning off all the switches;
e) turning on the second switch;
f) measuring the output voltage from the voltage follower;
g) repeating the step b) to the step f) for a number of cycles until an output voltage from the voltage follower is greater than a reference voltage; and
h) translating the output voltage into a predetermined form.

* * * * *